United States Patent [19]
Knowles
[11] 3,999,931
[45] Dec. 28, 1976

[54] COOKER ASSEMBLY

[75] Inventor: William L. Knowles, Dallas, Tex.
[73] Assignee: K-N-P, Dallas, Tex.

[22] Filed: Jan. 30, 1976
[21] Appl. No.: 654,049
[52] U.S. Cl. .................... 425/445; 249/79; 425/407; 425/411
[51] Int. Cl.² .................... B29J 5/08
[58] Field of Search .............. 425/378 R, 406, 405, 425/407, 445, 411, 200; 249/79; 100/281

[56] References Cited

UNITED STATES PATENTS

| | | | |
|---|---|---|---|
| 1,126,954 | 2/1915 | Burroughs et al. | 425/407 X |
| 2,717,421 | 9/1955 | Beeson | 425/411 |
| 3,142,185 | 7/1964 | Knowles | 100/281 X |
| 3,229,009 | 1/1966 | Knowles | 425/200 X |
| 3,289,257 | 12/1966 | Richards | 249/79 |

*Primary Examiner*—J. Howard Flint, Jr.
*Attorney, Agent, or Firm*—Richards, Harris and Medlock

[57] ABSTRACT

A cooker assembly for use in heat forming a discontinuous cross-section of mold extruded granular material. The cooker assembly has two frames pivotally connected at one end. A pair of hydraulic cylinders are interconnected between the frames for moving the two frames between opened and closed positions. The upper frame has a planar surface for engaging the upper surface of the material as it leaves the mold and is provided with longitudinal heaters for heating the materials as it passes through the cooker assembly. The lower frame has an uneven contoured surface closely approximating the lower surface of the material as it is extruded and heaters extending longitudinally therethrough for heating the material as it passes through the cooker assembly. The upper frame may be adjusted relative to the lower frame such that longitudinal friction forces on the extruded material moving through the cooker assembly can be varied across the width of the cooker assembly thus maintaining the density in the material created in the molding process.

30 Claims, 4 Drawing Figures

COOKER ASSEMBLY

BACKGROUND AND SUMMARY OF THE INVENTION

The present invention relates to improvements in apparatus for manufacturing discontinuous cross-section structural board from granular materials.

In the manufacture of discontinuous cross-section structural board from granular material, it is conventional to use apparatus as described in U.S. Pat. No. 3,229,009, issued Jan. 11, 1966, entitled METHOD AND APPARATUS FOR FORMING COMPOSITION BOARD and U.S. Pat. No. 3,142,185, issued July 28, 1964, entitled PISTON STROKE ADJUSTMENT. In apparatus of this type, particulate material such as various types of wood sawdust, wood chips, wood scraps, and the like, which have been comminuted, are used in the formation of structural members. The particulate material is conventionally mixed with a thermosetting adhesive and is then forced through a mold. In the molding of these products, economic factors make it desirable to obtain as high a rate of production as possible. In forming structural board by this process, it is necessary to maintain the particulate material in a state of compression while heat penetrates the material causing the thermosetting adhesive to bond the particles. Once this bonding is complete, the compression may be removed.

One problem encountered in developing equipment for molding these materials is that the rate of heat penetration varies with numerous factors such as mold temperatures, section thickness, specific heat of the material, moisture content, particle size, material distribution in the mold, and density. In addition, it has been found that in lower density boards, the pulsating forces of the plunger forcing the material through the mold will cause weakening of internal bonds of the particulate material after the initial molding process. If the length of the mold in terms of direction of material travel is increased to reduce the effect of the plunger impact on the material as it exits the mold, mold friction is increased, which in turn may increase the density of the material beyond the desired amount. Further, the entrapment of steam and other gases along this increased mold length may delay curing of the adhesives.

Therefore, there exists a need for an improved molding apparatus capable of curing the extruded material while controlling density and preventing weakening of the material due to the pulsating forces introduced by the plunger.

The present invention provides an improved cooker apparatus which is positioned at the discharge end of the mold and which is provided with an upper cooker plate conforming to the upper surface of the material exiting the mold. Longitudinally extending heaters are provided in contact with the upper cooker plate. A lower cooker surface is defined by a plurality of longitudinally extending bars which contact the lower surface of the material in areas spaced between the legs thereof. The upper cooker plate may be adjusted relative to the lower bars such that compression can be varied longitudinally and transversely across the material. In addition, spaces are provided between the lower bars sufficient to allow loose material to fall out of the cooker and steam and other gases to escape from the material as it cures in the cooker.

BRIEF DESCRIPTION OF THE DRAWINGS

The objects and many of the attendant advantages of the invention will be readily appreciated by those of ordinary skill in the art as the same becomes better understood by reference to the following Detailed Description when considered in connection with the accompanying Drawings in which.

DESCRIPTION OF THE PREFERRED EMBODIMENT

Figure 1:
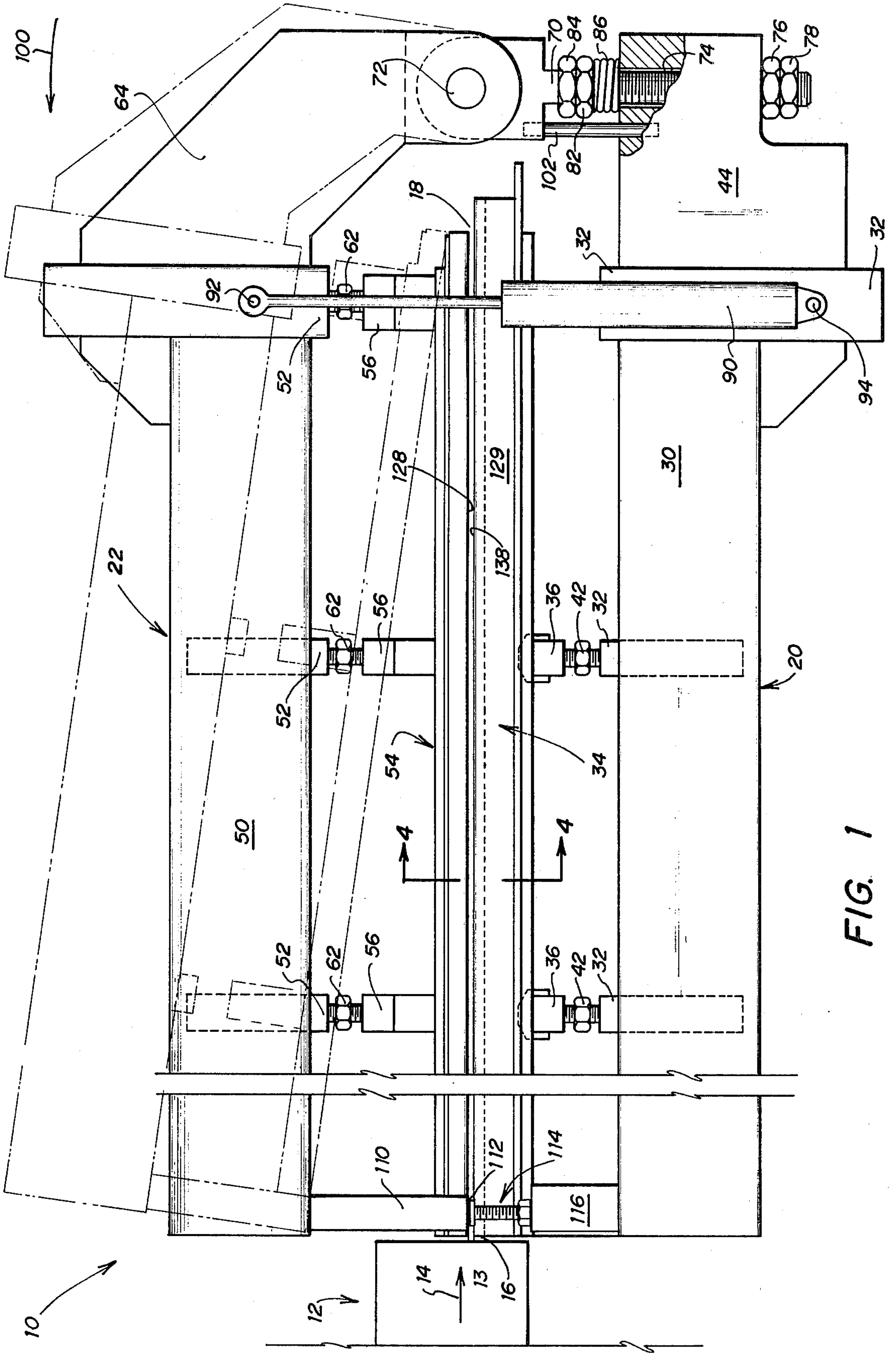
FIG. 1 illustrates a side elevation of the cooker assembly.

Referring now to the Drawings wherein like reference characters designate like or corresponding parts throughout the several views, there is illustrated a cooker assembly for use with an apparatus such as the one described and disclosed in applicant's prior U.S. Pat. No. 3,229,009, entitled "Method and Apparatus for Forming Composition Boards", issued Jan. 11, 1966, the disclosure of which is incorporated herein by reference. The cooker assembly disclosed herein is utilized to receive the material exiting from the discharge end of the mold apparatus and apply longitudinal compression forces onto the material to insure proper curing of the material.

Referring now to FIG. 1, it can be seen that the cooker assembly 10 is positioned to the rear of the mold 12. As is illustrated in FIG. 1, extruded material 13 will exit from mold 12 in the direction of arrow 14 and will enter the front end 16 of the cooker assembly. The material is forced through the cooker assembly 10 and exits at the rear or discharge end 18. As will hereinafter be described in detail, the cooker assembly is provided with structure for applying a longitudinal compression force to the material as it moves through the cooker assembly while allowing for a discharge of gases or loose particles from around the material. In addition, the cooker assembly has structure for adjusting of the compression forces across the width of the extruded material as it moves through the cooker assembly.

Cooker assembly 10 has lower and upper frame assemblies 20 and 22, respectively. Lower frame assembly 20 is provided with legs having casters thereon for movably supporting the cooker assembly adjacent to the rear of mold 12. The lower frame assembly has a pair of parallel spaced longitudinally extending frame members 30, which extend the length of cooker assembly 10. These frame members 30 are positioned adjacent the outer edge of lower frame assembly 20. A plurality of parallel spaced transversely extending lower cross frame members 32 are rigidly fixed to and extend between frame members 30.

A lower cooker plate assembly 34 extends along the length of the cooker assembly 10 and is supported from the lower cross frame members 32. The detailed structure of the lower cooker plate assembly 34 will be described hereinafter in detail. It is important to note in FIGS. 1 and 2 that the lower cooker plate assembly 34 has a plurality of parallel spaced cross supports 36 which extend across the width of the cooker assembly and are positioned immediately over the lower cross frame members 32. A plurality of coaxially positioned threaded bores 38 and 40 are formed in cross frame members 32 and cross supports 36, respectively. Bores 38 and 40 are spaced across the width of cooker assembly 10 and are oppositely threaded to receive a plurality of right-hand, left-hand threaded adjusting screws 42. The rearmost lower cross frame member 32 is of a thicker cross-section than the other cross frame members and has a pair of flanges 44 extending therefrom, the purpose of which will be hereinafter described.

Upper frame assembly 22 has a pair of longitudinally extending parallel spaced upper frame members 50 which extend the length of the cooker assembly. A plurality of parallel spaced upper cross frame members 52 are rigidly fixed to and extend between frame members 50. These cross frame members 52 are spaced such that they can be aligned with the cross frame members 32 on the lower frame assembly.

An upper cooker plate assembly 54 is supported from the upper frame assembly as will be described hereinafter. The details of construction of the upper cooker plate assembly will likewise be described hereinafter in detail. The upper cooker plate assembly has a plurality of parallel spaced cross supports 56 which extend across the width of the upper frame assembly 22. These cross supports 56 are positioned in a parallel spaced relationship which coincides with the spacing of the cross frame members 52.

A plurality of oppositely threaded coaxial bores 58 and 60 are formed in cross frame members 52 and cross supports 56, respectively, and are spaced across the width of the cooker assembly. A plurality of right and left-hand threaded adjusting screws 62 are threaded into bores 58 and 60 to interconnect the frame members 52 to the cross supports 56. By use of these adjusting screws 62, the relative position between the cross supports 56, and thus the upper cooker plate assembly 54, can be adjusted with respect to the cross frame members 52. The rearmost cross frame member 52 has a thicker cross-section than the other cross members, and is provided with a pair of flanges 64, which extend rearwardly from the end thereof. These flanges 64 each have a bifurcated portion 66 (FIG. 3), which extends to the rear and downwardly from the upper frame assembly 22.

Eye bolts 70 are positioned with the head thereof extending into the bifurcated portion 66, and a pivot pin 72 rotatably couples the eye bolts 70 to the bifurcated portion 66. Clearance bores 74 are formed in each of the flanges 44. These clearance bores 74 are sized to permit free sliding movement of the shank eye bolts 70 therethrough. As is illustrated in FIG. 1, the shank of each eye bolt 70 is positioned to extend through clearance bores 74. A nut and lock nut 76 and 78, respectively, are threaded onto the end of the shank of each eye bolt extending through bore 74. A nut and lock nut 82 and 84, respectively, are positioned around the shank of each of the eye bolts 70 between the head of the eye bolts and upper surface of flange 44. A spring 86 is positioned between each nut 82 and the upper surface of flange 44.

Double acting fluid actuated hydraulic cylinders 90 have one end fastened at 92 through upper cross frame member 52 and the other end fastened at 94 to the lower cross frame member 32. By selectively controlling the supply of hydraulic fluid to cylinders 90, the upper frame assembly 22 can be caused to rotate with respect to the lower frame assembly 20 about pins 72 in the forward and reverse direction of arrow 100. Pins 102 extend between apertures in the head of eye bolts 70 and the flange 44 to restrict rotation of the eye bolts in clearance bores 74.

By actuating hydraulic cylinders 90 to extend the length thereof, the upper frame assembly 22 can be caused to rotate about pins 72 in the reverse direction of arrow 100 to the position illustrated in phantom lines in FIG. 1. This allows access to the interior of the cooker assembly for cleaning and service and the like.

Stop bars 110 are attached to the upper frame assembly 22 and are positioned on the outside edges thereof. Each stop bar 110 has a lower surface 112 for resting on the upper end of a set screw assembly 114 supported from a bracket 116 on frame assembly 20. Thus by adjusting the set screw assembly 114, the relative height of the upper frame assembly with respect to the lower frame assembly at the front of the cooker assembly can be set.

Conversely, if hydraulic fluid is appropriately supplied to cylinders 90 to shorten the effective length thereof, the rear end of the upper frame 22 will be forced in a downward direction toward frame 20. This force will be transmitted through flanges 64 to eye bolts 70 to compress springs 86. The amount of this compressive movement can be varied by adjusting nuts 76 and 82.

Figure 2:
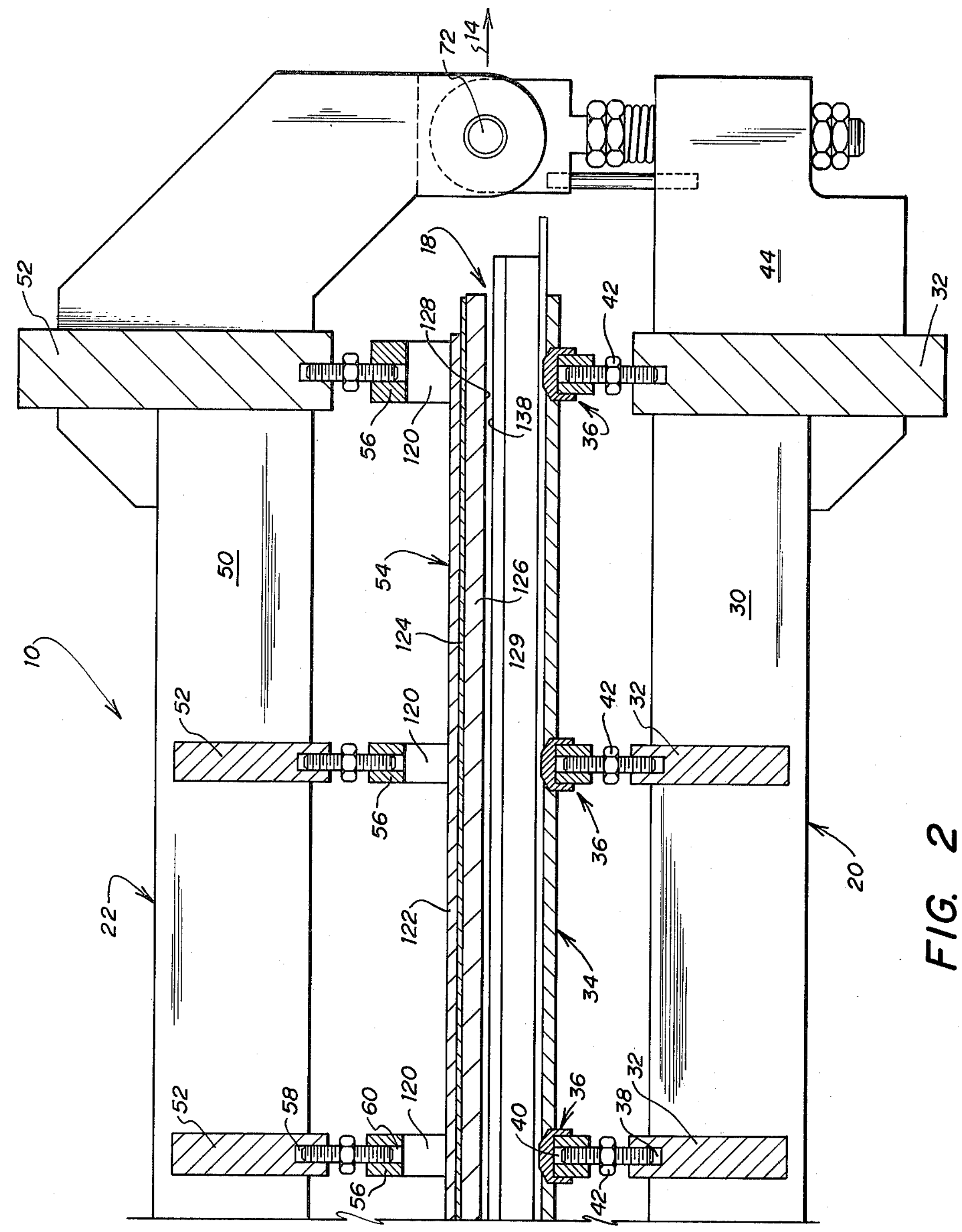
FIG. 2 is a longitudinal section of the device taken along line 2—2 of FIG. 3, looking in the direction of the arrows.

The details of the upper and lower cooker plate assemblies 54 and 34, respectively, are best shown in FIG. 2. The upper cooker plate assembly 54 has a plurality of spacer bars 120 which extend from the lower surface of the cross support 56. An upper heater plate 122 extends across the width and along the length of the cooker assembly 10. Heater plate 122 is in turn supported from the lower surface of the spacer bars 120 of the various cross supports 56. A plurality of longitudinally extending heaters 124 are mounted on the lower surface of the upper heater plate 122. These heaters are typically thermostatically controlled and extend along the length of the cooker assembly 10. A lower heater plate 126 is positioned in a spaced parallel relationship to upper heater plate 122 with the heaters 124 being retained therebetween. The lower surface 128 of the lower heater plate 126 forms the upper contact surface for the extruded material as it leaves the mold. This surface 128 will engage the upper surface of the material during its movement through the cooker assembly. The relative position and orientation of surface 128 can be adjusted by adjusting the various adjusting screws 62.

Each of the longitudinal heaters 124 on the outsides of the cooker assembly have a different heat capacity and are under separate temperature controls from those heaters 124 in the center. This provides for compensating for heat losses at the sides of the device. In addition, preferably all the heaters have a greater heat capacity at the forward and rear end of the cooker assembly to compensate for heat losses in those areas. This arrangement assures a uniform temperature in all areas of the cooking assembly.

Figure 3:
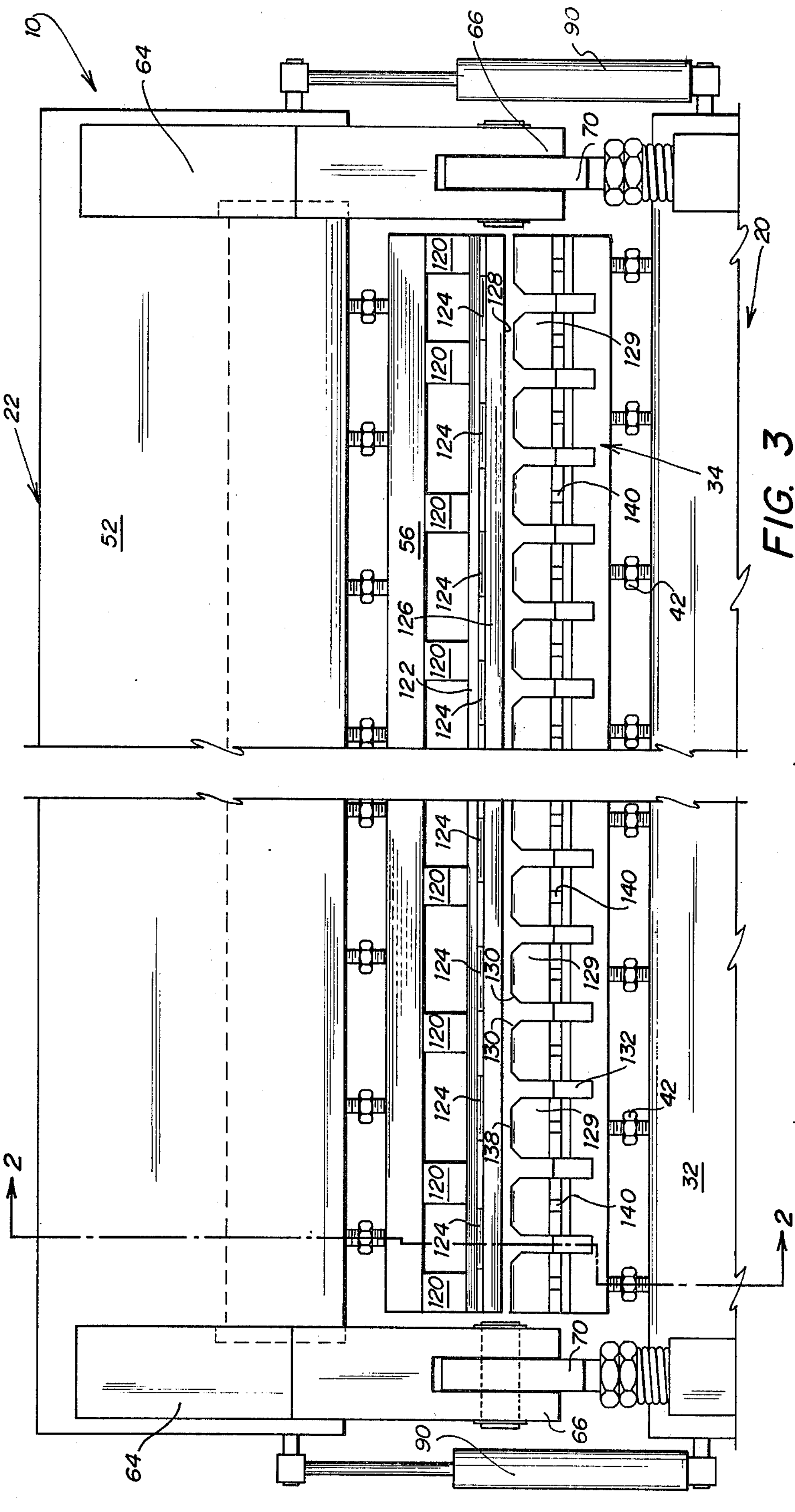
FIG. 3 illustrates a rear end elevation view of the device illustrated in FIG. 1.
Figure 4:
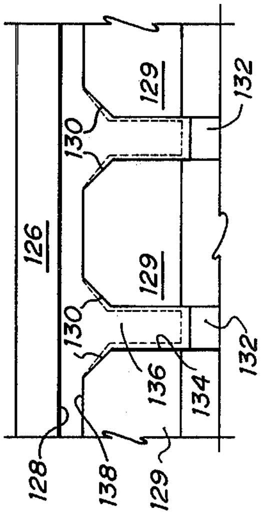
FIG. 4 illustrates an enlarged section view taken along line 4—4 of FIG. 1, looking in the direction of the arrows.

The lower cooker plate assembly 34 is best illustrated in FIGS. 3 and 4. The lower cooker plate assembly 34 comprises a plurality of parallel spaced longitudinal bars 129 which extend the length of cooker assembly 10. These bars have beveled corners 130 and are separated by spacer blocks 132 to form longitudinally extending slots 134 between each of the parallel bars 129. Thus, lower heater plate 126 and bars 129 form an opening therebetween which substantially conforms to the cross-section of material 13 being extruded into the cooker assembly. The lower cooker plate assembly 34 contacts material 13 along the upper surface 138 of bars 129. The surface 138 faces the surface 128 of the lower heater plate 126 for compression of the material therebetween. However, as can be seen in FIG. 4, slots 134 formed between bars 129 are larger than flanges 136, illustrated in dotted lines, of material 13, and there is no contact on the flange 136 of material 13.

Each of the bars 129 is provided with a longitudinally extending heater 140 implanted within bars 129 which functions to heat the bars. The bars 129 adjacent the sides of the cooker assembly 10 are under a separate temperature control from those in the center so as to compensate for heat losses at the sides. In addition, the bar heaters have a greater heat capacity at each end of the assembly to compensate for heat losses in those areas adjacent the ends, thus permitting uniform temperature in the cooking area. In addition, it is noted that the position of surface 138 defined by bars 129 relative to surface 128 defined by lower heat plate 126 can be adjusted in a flat and in plane position by adjusting screws 42 and 62 as desired irrespective of the flatness of relative in-plane position of the frame members themselves. Adjusting screws 42 and 62 are likewise used to adjust surfaces 128 and 138 such that they are transversely parallel one to the other.

In operation, as material 13 moves in the direction of arrow 14 from the rear end of mold 12 into front end 16 of cooker assembly 10, the material comes into contact with the surfaces 128 and 138. It is to be noted, of course, that a space is provided in slots 134 around the flanges 136 of the material to allow for the escape of steam and other gases therefrom. In addition, there is no closure member at the bottom of the slots 134 allowing loose material to fall out therethrough.

If during operation of the device, it is necessary to prevent decrease in the density of the formed material exiting the cooker, the relative position of plate surfaces 138 and 128 can be altered by actuating hydraulic cylinder 90 to compress springs 86 as previously described. In addition, if side-to-side variations in material travel are experienced, this may be altered by actuating one or the other of the cylinders as required to increase or reduce the friction forces across the width of the assembly.

Thus, the present invention teaches an improved cooking apparatus which provides for variation in the longitudinal compression forces as the material exits the mold in a board molding apparatus. By reason of the particular structure of the cooker assembly, uniform can be achieved throughout the formed material by selectively applying compressive forces on the upper and lower surfaces of the material without destroying the structural integrity of the flanges thereon.

It is to be understood, of course, that the foregoing disclosure relates only to the preferred embodiments of the present invention and that numerous alterations and modifications can be made therein by those of ordinary skill in the art without departing from the spirit and scope of the invention as set forth in the appended claims.

What is claimed is:

1. In an apparatus for heat forming extruded material in a cavity formed by a top cooking section having a flat surface forming the upper surface of the cavity and a bottom cooking section having an uneven contoured surface forming the lower surface of the cavity in combination comprising:

adjustment means interconnected between the top cooking section and the bottom cooking section for providing compression on selective opposing faces of the extruded material passing through the cavity, heater means embedded within the top cooking section and the bottom cooking section for heat curing the material as it passes through the cavity.

2. The apparatus of claim 1 wherein said adjustment means permits adjustment of the top cooking section in relation to the bottom cooking section such that longitudinal friction forces on the extruded material moving through the cavity can be varied across the width of the apparatus to maintain the density of the material.

3. The apparatus of claim 2 wherein the top cooking section comprises an upper frame, a heater plate and means for varying the position of the heater plate relative to the upper frame; and wherein the lower cooking section comprises a lower frame pivotally attached to said upper frame, heater bars for forming the lower contour surface of the mold cavity, and means for adjusting the position of the heater bars relative to said lower frame.

4. The apparatus of claim 3 wherein the contoured surface of said bottom cooking section is slotted to permit escape of gases and loose particles from the material as it moves through the forming apparatus.

5. The apparatus of claim 3 wherein said heater bars and heater plate near the edge of the forming structure have a larger heat capacity to compensate for heat losses at the outer edges of the structure.

6. The apparatus of claim 3 further characterized by:

means for adjusting said upper frame relative to said lower frame as the material is passing through the cavity such that longitudinal friction and compression on the material may be varied.

7. The apparatus of claim 6 wherein said adjusting means further comprises:

hydraulic cylinders joining said upper and lower frames adjacent the pivotal connection of said frames, spring means incorporated with said pivotal connection for permitting movement of the end of said upper frame adjacent the pivotal connection toward the corresponding end of said lower frame by shortening said hydraulic cylinders.

8. In an apparatus for heat forming extruded material where the extruded material has a flange portion interconnecting downwardly extending leg portions, the combination comprising:

a top cooking section having a flat surface defining the upper surface of a cavity for receiving the extruded material, said flat surface corresponding to the upper surface of the flange portion of the extruded material, a bottom cooking section having an uneven contoured surface forming the lower surface of the cavity and corresponding to the contour of the underside of the flange portion and the leg portions of the extruded material, heater means embedded in said top cooking section and said bottom cooking section for heat curing the material passing through the cavity, adjustment means interconnected between said top and bottom cooking sections for providing compression on selective opposing surfaces of the extruded material as it passes through the cavity.

9. The apparatus of claim 8 wherein said bottom cooking section comprises:

a lower frame, and a plurality of heater bars adjustably attached to said lower frame and contoured to contact the lower surface of the flange portion of the extruded material without contacting the leg portions such that compression forces applied to the extruded material is applied only to the flange portion.

10. The apparatus of claim 9 further comprising:

pivot means for pivotally joining said upper and lower frames at one end thereof, spring means interconnected between said pivot means and said lower frame for normally maintaining the pivot end of said upper frame a spaced distance from the corresponding end of said lower frame, and compression means interconnected between said upper and lower frames adjacent said pivot means for selectively compressing said spring means to adjust said upper frame relative to said lower frame.

11. In an apparatus for forming extruded material where the extruded material has a flange portion interconnecting downwardly extending leg portions, the combination comprising:

a top section having a flat surface defining the upper surface of a cavity for receiving the extruded material, said flat surface corresponding to the upper surface of the flange portion of the extruded material, a bottom section having an uneven contoured surface forming the lower surface of the cavity and corresponding to the contour of the underside of the flange portion and the leg portions of the extruded material, means for feeding the extruded material into said cavity formed by said top and bottom sections, and adjustment means interconnected between said top and bottom cooking sections for providing compression on selective opposing surfaces of the extruded material as it passes through the cavity.

12. The apparatus of claim 11 wherein said bottom cooking section comprises:

a lower frame, and a plurality of bars adjustably attached to said lower frame and contoured to contact the lower surface of the flange portion of the extruded material without contacting the leg portions such that compression forces applied to the extruded material is applied only to the flange portion.

13. The apparatus of claim 11 wherein said adjustment means comprising:

pivot means for pivotally joining said upper and lower sections at one end thereof, spring means interconnected between said pivot means and said lower section for normally maintaining the pivot end of said upper section a spaced distance from the corresponding end of said lower section, and compression means interconnected between said upper and lower sections adjacent said pivot means for selectively compressing said spring means to adjust said upper section relative to said lower frame.

14. In an apparatus for heat curing extruded material in a cavity having one flat surface and an uneven contour surface opposite the flat surface, the combination comprising:

a flat plate forming the flat surface of the cavity, a plurality of laterally spaced, longitudinally extending bars opposing said flat plate to form a cavity between said flat plate and said bars for supporting the extruded material as it is passed through the cavity.

15. The apparatus of claim 14 wherein said flat plate forming one surface of the cavity is supported on a frame, and further comprising means for adjusting the surface of said plate in relation to said frame.

16. The apparatus of claim 15 wherein the bars forming the surface of said cavity opposite said flat plate are supported on a frame, and further comprising means for adjusting the surface of said bars relative to said frame.

17. The apparatus of claim 14 further comprising an adjustment means attached to said plate and said bars for controlling the relationship of the opposing surfaces of said cavity.

18. The apparatus of claim 17 wherein said adjustment means controls the relationship of the opposing surfaces of said cavity to maintain said surfaces laterally parallel.

19. The apparatus of claim 14 further comprising pivot means attached between said plate and said bars adjacent one end of the cavity for permitting rotation of said flat plate relative to said bars to control the relationship of the cavity surfaces along the longitudinal length thereof.

20. The apparatus of claim 19 further comprising means for adjusting said pivot means whereby the vertical height of the cavity at its exit end may be varied and whereby the opposing surfaces of the cavity may be adjusted to maintain the surfaces laterally parallel.

21. The apparatus of claim 19 wherein said pivot means comprises a compression means for moving said pivot means to maintain a predetermined cavity height between the opposing surfaces of said plate and said bars, and further comprising an adjustment means for varying the height of the cavity between said plate and said bars by compressing said compression means thereby exerting longitudinal friction on the extruded material as it passes through the cavity.

22. The apparatus of claim 19 whereby the frames supporting said flat plate and said bars are interconnected by said pivot means.

23. The apparatus of claim 14 further comprising power activated cylinders attached between said flat plate and said bars, said cylinders being adapted to move said plate surface toward and away from said bar surfaces of the cavity.

24. The apparatus of claim 23 wherein said cylinders are double acting such that contraction of said cylinders exerts compressive forces on opposing faces of the extruded material as it passes through the cavity.

25. The apparatus of claim 24 whereby said power activated cylinders are located intermediate of the ends of said cavity.

26. The apparatus of claim 24 whereby said cylinders may be controlled to vary the height of the cavity along the transverse width thereof to maintain the density of the material.

27. The apparatus of claim 14 whereby said bars forming one surface of the cavity are spaced apart to provide slots therebetween so that only a portion of the extruded material is in contact with said bars thereby permitting the escape of gasses and loose particles as the extruded material passes through the cavity.

28. The apparatus of claim 14 further comprising heat means for directing heat to the cavity to maintain the desired temperature on the extruded material as it passes through the cavity.

29. The apparatus of claim 14 further comprising heat means for applying heat directly to said flat plate forming one surface of the mold cavity, and heat means for applying heat directly to each bar forming the opposing surface of said cavity.

30. The apparatus of claim 19 whereby said heat means applying more heat to each edge of said flat plate in relation to that applied in the center and more heat to said bars at each side of the cavity in relation to that applied to said bars in the center to maintain uniform temperature throughout the cavity.

* * * * *